(12) United States Patent
Hauser et al.

(10) Patent No.: US 6,224,352 B1
(45) Date of Patent: ***May 1, 2001

(54) PISTON PUMP IN A BRAKE SYSTEM OF A VEHICLE

(75) Inventors: Manfred Hauser, Schwieberdingen; Norbert Alaze, Markgroeningen; Thorsten Duermeier, Vaihingen/Enz; Ursula Eckstein, Schwieberdingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/269,668
(22) PCT Filed: Jul. 23, 1998
(86) PCT No.: PCT/DE98/02070
    § 371 Date: May 28, 1999
    § 102(e) Date: May 28, 1999
(87) PCT Pub. No.: WO99/06698
    PCT Pub. Date: Feb. 11, 1999

(30) Foreign Application Priority Data

Jul. 30, 1997 (DE) .............................................. 197 32 812
Jul. 14, 1998 (DE) .............................................. 198 31 450

(51) Int. Cl.$^7$ ............................ F04B 23/00; F15B 21/04
(52) U.S. Cl. .................... 417/313; 92/78; 417/549; 417/554
(58) Field of Search .................................... 417/313, 554, 417/470, 549; 91/447

(56) References Cited

U.S. PATENT DOCUMENTS

| 4,958,553 | * | 9/1990 | Ueno ...................................... 91/447 |
| 6,082,244 | * | 7/2000 | Siegel et al. .......................... 417/313 |

* cited by examiner

Primary Examiner—Timothy S. Thorpe
Assistant Examiner—Cheryl J. Tyler
(74) Attorney, Agent, or Firm—Ronald E. Greigg; Edwin E. Greigg

(57) ABSTRACT

A piston pump for a slip-controlled hydraulic brake system for a vehicle. A tubular filter is mounted on a bush of the piston pump; the filter has a filter ring that forms a guide ring and is spaced apart from the bush and axially guides the piston by a part of the piston that protrudes from the bush. A separate guide ring is dispensed with, and the structural length of the piston pump can be shortened.

7 Claims, 1 Drawing Sheet

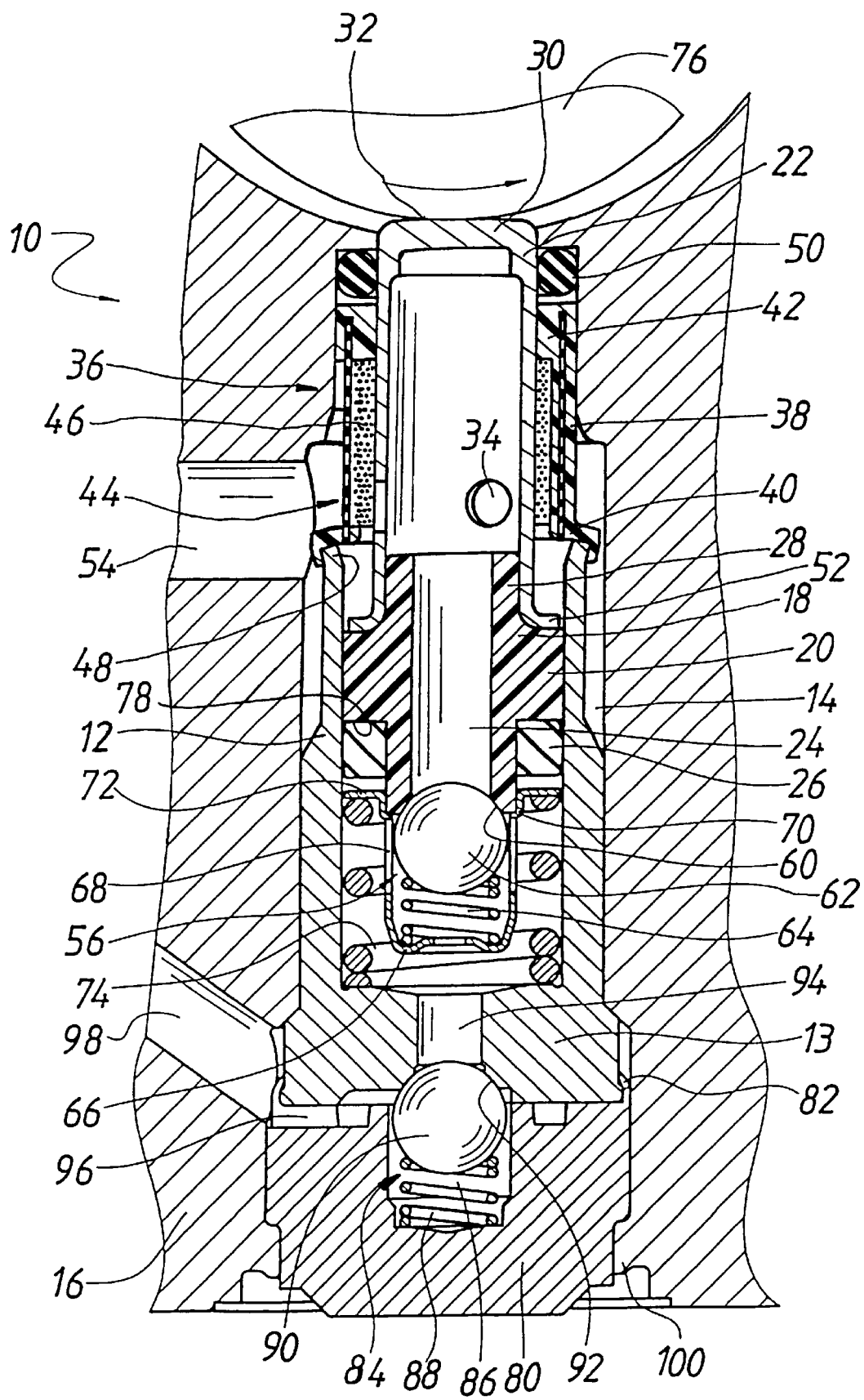

PISTON PUMP IN A BRAKE SYSTEM OF A VEHICLE

PRIOR ART

The invention relates to a piston pump in a brake system of a vehicle.

Such a piston pump is known from German Patent Disclosure DE 40 27 794 A1. The known piston pump has a rodlike piston, which is received axially displaceably in a bush that is inserted into a pump housing. One end of the piston protrudes from the bush. On this end of the piston, the piston is driven to execute an axially reciprocating stroke motion by means of an eccentric element that can be driven to rotate by an electric motor and that acts upon the piston on its face end that protrudes from the bush. In the bush, the piston is axially displaceably guided by a plastic guide ring inserted into the bush. On its end protruding out of the bush, the piston is axially displaceably guided in the pump housing by a further plastic guide ring that is inserted into the pump housing.

ADVANTAGES OF THE INVENTION

The piston pump of the invention has the advantage first that fluid pumped by the piston pump is filtered. The filter element is preferably disposed in the inflow region of the piston pump and thus prevents dirt particles from getting into the piston pump.

The filter element is mounted on the bush in the extension of the bush and has a guide element outside the bush that displaceably guides the piston axially to the bush. This has the advantage that a separate guide element can be dispensed with, thus saving the expense of producing a separate guide element, and the effort of assembly of a separate guide element is omitted. The invention also makes it possible to shorten the structural length of the piston pump by leaving out a separate guide element and/or enlarging the filter area by making the filter element longer. As a result, the filtration can be made more effective, and in particular the aspiration performance of the piston pump of the invention in pumping a viscous fluid, such as cold brake fluid, can be improved. The invention also makes it possible, by omitting a separate filter element, to use a sealing ring with a larger diameter for sealing off the piston in the pump housing on the end of the piston protruding from the bush, without increasing the structural length of the piston pump. A sealing ring with a larger qt reduces leakage from the piston pump toward the eccentric element that drives the piston, since the sealing ring has a larger wearing volume.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). For instance, the pump is needed in a brake system with wheel slip control (ABS or ASR) and/or a brake system serving as a steering aid (FDR) and/or an electrohydraulic brake system (EHB). With wheel slip control (ABS or ASR), locking of the vehicle wheels during a braking event involving strong pressure on the brake pedal (ABS), and/or spinning of the driven wheels of the vehicle in the event of strong pressure on the gas pedal (ASR), can for instance be prevented. In a brake system serving as a steering aid (FDR), a brake pressure is built up in one or more wheel brake cylinders independently of an actuation of the brake pedal or gas pedal, for instance to prevent the vehicle from breaking out of the track intended by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF THE DRAWING

The invention will be described in further detail below in terms of an exemplary embodiment shown in the drawing. The sole drawing FIGURE shows a piston pump of the invention in axial section.

DESCRIPTION OF THE EXEMPLARY EMBODIMENT

The piston pump of the invention, shown in FIG. 1 and identified by reference numeral 10, has a bush 12 with a bush bottom 13 integral with it; the bush is inserted into a stepped pump bore 14 of a hydraulic block that forms a pump housing 16. The hydraulic block, of which only a fraction surrounding the piston-pump 10 is shown in the drawing, is part of a slip-controlled hydraulic vehicle brake system not otherwise shown. Besides the piston pump 10, other hydraulic elements such as magnet valves and hydraulic reservoirs are inserted in this block, and a master cylinder and wheel brake cylinders (not shown) are connected to it. By means of the hydraulic block, the hydraulic components are hydraulically connected to one another.

In the bush 12, a piston 18 is received to approximately half its length. The piston 18 is composed in two parts: a valve part 20 and a buffer piece 22. The valve part 20 is a rotationally symmetrical part made by injection molding of fiber-reinforced plastic and is provided with an axial through hole 34. The valve part 20 is received axially displaceably in the bush 12 and is sealed off in the bush 12 by a sealing ring 26. Since the valve part 20 is of plastic, it is guided directly in the bush 12, i.e., without the use of a guide ring or the like.

The valve part 20 has a connection protrusion 28 that is coaxial and integral with it and that protrudes from the valve part 20 on an open side of the bush 12. The buffer piece 22 is pressed onto the connection protrusion 28. The buffer piece 22 is a hollow-cylindrical part, made by deforming metal, for instance by upsetting, which on an end remote from the valve part 20 is closed by an end wall 30 that is integral with the buffer piece 22. The end wall 30 forms a buffer face 32. The buffer piece 22 is hardened, at least in the region of the end wall 30, to increase the wear resistance. The buffer piece 22 is connected to the connection protrusion 28 of the valve part 20 with a press fit; that is, the buffer piece 22 adheres to the connection protrusion 28 by frictional engagement with a clamping force. For admitting fluid, inlet holes 34 are made in a circumferential wall of the buffer piece 22.

A hollow-cylindrical filter 36 surrounding the buffer piece 22 of the piston 18 that protrudes out of the bush 12 is mounted on the open end of the bush 12 and lengthens the bush 12. The filter 36 has a filter scaffold 38, 40, 42 with axially parallel-extending filter struts 38, which integrally join two spaced-apart filter rings 40, 42 together. The filter scaffold 38, 40, 42 is an injection-molded fiber-reinforced plastic part. The filter struts 38 and the filter rings 40, 42 frame filter windows 44, in which a filter material (woven filter cloth) or a perforated metal sheet acting as a filter screen 46 is disposed. The filter screen 46 is tubular; it is uninterrupted in the circumferential direction, and the filter scaffold 38, 40, 42 is spray-coated onto it, so that the filter screen 46 completely fills the filter windows 44.

The filter ring 40 oriented toward the bush 12 is embodied in flangelike fashion, protruding outward from the filter 36, in the form of a securing ring 40. To secure the filter 36, one end edge 48 of the bush 12, on the open end of the bush 12, is embodied to extend obliquely outward. The securing ring 50 of the filter 36 is deformed, for instance by hot stamping, to fit over and behind the obliquely outward-extending end edge 48 of the bush 12, and as a result the filter 36 is mounted on the open face end of the bush 36 and coaxially lengthens the bush 12.

The filter ring 40 secured to the end edge 48 of the bush 12 and forming the securing ring of the filter 36 has an inside diameter that is larger than the outside diameter of the buffer piece 22 of the piston 18, and the securing ring 40 is spaced radially apart from the buffer piece 22. The filter struts 38 are also disposed with radial spacing outside the buffer piece 22 of the piston 18. The filter ring 42 farther from the bush 12 has a smaller diameter than the filter ring 40 disposed on the end edge 48 of the bush 12, and the filter ring 42 farther from the bush 12 protrudes farther inward than the filter ring 40 disposed on the end edge 48 of the bush 12 and farther inward than the filter struts 38. The filter ring 42 farther from the bush 12 has an inside diameter equivalent to the outside diameter of the buffer piece 22 of the piston 18 and forms a guide ring 42, which guides the piston 18 axially to the bush 12 on its buffer piece 22 that protrudes from the bush 12. The guide ring 42, which is integral with the filter 36, is seated with a close fit in the pump bore 14 in the pump housing 16, which assures an axial disposition of the guide ring 42 and thus an axial disposition of the piston 18 on th its buffer piece 22.

Adjoining the filter 36, an O-ring 50, serving as a sealing ring, is placed in an annular shoulder of the pump bore 14; it is held in its position in the pump bore 14 by the filter ring 42 that forms the guide ring and seals off the piston 18 in the pump housing 16.

At the same time, the filter 36 is a means for preventing the piston 18 from being lost in the bush 12. The inside diameter of the filter ring 40 disposed on the end edge 48 of the bush 12 is less than an outside diameter of the valve part 20 of the piston 18 outside the connection protrusion 28, so that the filter ring 40 disposed on the end edge 48 of the bush 12 holds the piston 18 on the valve part 20, or on a radially outwardly flared flange ring 52 of the buffer piece 22 that rests on the valve part 20.

Fluid admission is effected through an inlet bore 54, which is made radially to the pump bore 14 in the pump housing 16 and discharges into the pump bore 14 approximately at the level of the filter 36. Brake fluid flowing from the inlet bore 54 into the piston pump 10 reaches the pump bore 14 and from there flows through the filter windows 44 and the inlet holes 34 in the buffer piece 22 of the piston 18 into the hollow-cylindrical buffer piece 22. From the buffer piece 22, the brake fluid flows through the through hole 24 of the valve part 20 to an inlet valve 56, which is disposed on a side of the valve part 20 facing toward a bush bottom 13.

The inlet valve 56 of the piston pump 10 of the invention is embodied as a spring-loaded check valve. An orifice of the through hole 24 in the valve part 20 is embodied as a conical valve seat 60, against which a valve ball 62, as a valve closing body, is pressed by a helical compression spring acting as a valve closing spring 64. The valve closing spring 64 is braced against a bottom of a cup-shaped valve cage 66, which is made as a deep-drawn sheet-metal part and has openings 68. On its open side, the valve cage 66 has an annular shoulder 70 extending all the way around, with which it rests on the face end of the valve part 20 of the piston 18, and a radial flange 72, by which it is pressed by a piston restoring spring 74 against the face end of the valve part 20 of the piston 18. The valve ball 62 and the valve closing spring 64 are received in the valve cage 66. The piston restoring spring 74 is supported on the bush bottom 13. It is embodied as much stronger than the valve closing spring 64, so that under all the loads that occur during operation of the piston pump 10, the piston restoring spring 74 keeps the valve cage 66 securely on the valve part 20, counter to the force of the valve closing spring 64.

For driving the piston 18 to execute an axially reciprocating stroke motion, the piston pump 10 of the invention has an eccentric element 76, which can be driven to rotate by an electric motor and against whose circumference the piston 18, with its buffer face 32, is pressed by the piston restoring spring 74.

The O-ring 50 located in the bush 12 is held with play in the axial direction between the radial flange 72 of the valve cage 66 and an annular shoulder 78 on the valve part 20 of the piston 18.

A cylindrical closure element 80 is seated on the bush bottom 13 and is connected to the bush 12 by a crimp 82. The closure element 80 closes the pump bore 14 in pressure-tight fashion and fixes the bush 12 in the pump housing 16. An outlet valve 84 in the form of a spring-loaded check valve is accommodated in the closure element 80: The closure element 80 has a coaxial blind bore 86, into which a helical compression spring, as a valve closing spring 88, and a valve ball 90, as a valve closing body, are inserted. The valve ball 90 cooperates with a conical valve seat 92, which is provided on an outside of the bush bottom 13 at an orifice of a center bore 94 that passes axially through the bush bottom 13. The valve seat 92 is formed by stamping and is hardened. An emission of brake fluid pumped by the piston pump 10 is effected through radial conduits 96 between the bush bottom 13 and the closure element 80 into a radial outlet bore 98 in the pump housing 16.

In addition to its function of axially guiding the piston 18 in operation of the piston pump of the invention, the filter ring 42 forming the guide ring 42 for the piston 18 and disposed spaced apart from the bush 112 and resting in the pump housing 14 has the function of keeping the piston aligned axially in the bush 12 until the bush 12 is inserted into the pump housing 16. The guide ring 42 prevents the piston 18 from becoming skewed in the bush 12, and as a result the bush 12, with the piston 18 inserted into it, can be inserted and press-fitted into the pump bore 14 without problems, and without the piston hitting the pump housing 16 or a shoulder or the like of the pump bore 14.

For assembly, the piston 18 is introduced, along with the O-ring 50, the inlet valve 56 mounted on the piston 18, and the piston restoring spring 74 mounted on the inlet valve 56, into the bush 12. The filter 36 is mounted on the end edge 48 of the bush 12 and is joined to the bush 12 by hot stamping of the securing ring 40 of the filter. The filter 36 that forms the loss prevention means keeps the piston 18, along with the inlet valve 56 and the piston restoring spring 74, in the bush 12. Mounting the closure element 80, into which the outlet valve 84 is inserted, on the bush 12 with the crimp 82 can be done either before or after the insertion of the piston 18 and the mounting of the filter 36 on the bush 12. The bush 12 with the piston 18 inserted, and with the filter 36 and the closure element 80 mounted, forms a preassembled unit that is inserted and press-fitted, fully assembled, into the pump bore and is secured in pressure-tight fashion in the pump housing 16 by means of a caulking 100 of the pump housing 16 that extends all the way around the housing.

The foregoing relates to a preferred exemplary embodiment of the invention, it being understood that other variants and embodiments thereof are possible within the spirit and scope of the invention, the latter being defined by the appended claims.

What is claimed is:

1. A piston pump comprising a pump housing (16), a piston (18) that is driven to execute a reciprocating stroke motion and that is received axially displaceably over part of a length (12) of said piston in a bush which is inserted into said pump housing, the piston pump (10) has a filter element (36), which is mounted on the bush (12) in an extension of the bush (12), and that the filter element (36) has a guide element (42), which axially displaceably guides the piston (18) on a part of the piston (18) that protrudes from the bush (12).

2. The piston pump according to claim 1, in which the filter element (36) is tubular and surrounds the part of the piston (18) that protrudes from the bush (12).

3. The piston pump according to claim 1, in which the guide element (42) is integral with the filter element (36).

4. The piston pump according to claim 1, in which the guide element is embodied as a guide ring (42).

5. The piston pump according to claim 4, in which the guide element (42) rests with a close fit in the pump housing (16).

6. The piston pump according to claim 1, in which the filter element (36) is joined to the bush (12) by a deformation.

7. The piston pump according to claim 1, in which the filter element (36) forms a loss prevention means for the piston (18) in the bush (12).

* * * * *